Patented Sept. 28, 1943

2,330,215

UNITED STATES PATENT OFFICE 2,330,215

METHOD OF PRODUCING THERAPEUTICALLY VALUABLE ALCOHOLS FROM GERMINAL GLAND HORMONES

Friedrich Hildebrandt, Berlin-Charlottenburg, Germany, assignor to Schering Corporation, Bloomfield, N. J., a corporation of New Jersey No Drawing. Application October 17, 1934, Serial No. 748,664. Renewed March 1, 1939. In Germany October 21, 1933

19 Claims. (Cl. 260—397.5)

It is known that the follicle hormone of the formula, $C_{18}H_{22}O_2$ and the male germinal gland hormone possess ketone properties. A carbonyl group is contained also in the molecule of the hitherto known synthetic substances having germinal gland hormone characteristics, for example, 1-keto-1,2,3,4-tetrahydrophenanthren (see Cook, Dodds & Hewett, Nature 131 (1933) page 56).

I have now found that it is possible to produce more valuable products by reacting the ketone group contained in the follicle hormone $C_{18}H_{22}O_2$ in known manner with organo-metal compounds, for example, according to the Grignard synthesis, with the aid of alkyl magnesium iodide, and after the decomposition of the reaction product with water and acid to obtain compounds in which the ketone group of the germinal gland hormone has been changed into an alcohol group.

By this treatment of hormones or related synthetic substances with organo-metallic compounds, products having a very considerably increased physiological action as compared with the original hormone are obtained. Thus, the follicle hormone of the formula $C_{18}H_{22}O_2$ contains 1,200,000 rat-units per gram. The methyl dihydro follicle hormone, on the other hand, contains 3,000,000 to 4,000,000 rat-units and the ethyl dihydro follicle hormone more than 2,000,000 rat-units. The male germinal gland hormone $C_{19}H_{30}O_2$ experiences by virtue of the conversion with methyl magnesium iodide an increase in effectiveness from 0.450 mg./capon-unit to 0.150 mg./capon-unit.

In a corresponding manner all other germinal gland hormones and synthetic substances of germinal gland hormone character, and likewise the derivatives of both groups of substances, for example, the ethers, esters, hydrogenation and oxidation products, provided that at least one ketone group is present in such substances, can be converted into alcohols in which the organic residue introduced into the molecule can be varied according to the Grignard reagent that has been selected for reaction.

I have found further that it is possible so to direct the course of the reaction in the above indicated process that, depending upon the nature of the organo-metallic compound employed for the reaction, secondary or tertiary alcohols can be obtained. Whereas in the conversion of, for example, follicle hormone and its derivatives (ether, ester, etc.) with organo-magnesium compounds according to the Grignard reaction, tertiary carbinols generally are produced, by the use of such Grignard reagents as, for example, isopropyl magnesium iodide which tend toward the formation of unsaturated hydrocarbons, secondary alcohols are formed. The reaction then proceeds according to the following equation in which R stands for a hydrocarbon radical (see Houben, volume III, page 82):

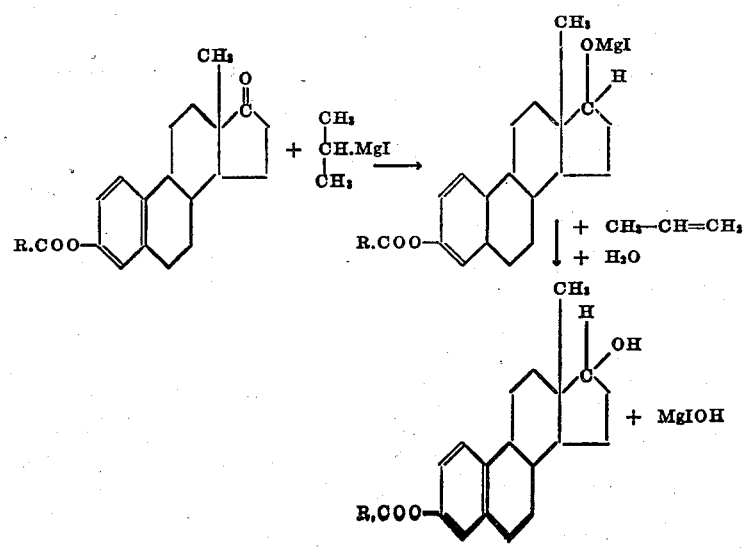

and leads in the present case to the production of dihydro follicle hormone $C_{18}H_{24}O_2$ or its monoacyl compound. In corresponding fashion the highly unsaturated female germinal gland hormones equilin, hippolin and equilenin, which are related to the follicle hormone $C_{18}H_{22}O_2$, and likewise the ketonelike male germinal gland hormones, which include androsterone and dehydroandrosterone compounds (see Butenandt & Coworkers, "Zeitschrift für physiologische Chemie," vol. 237, page 57 et seq.), and their derivatives, all of which have the cyclopentano phenanthrene structure, can be reduced to the corresponding secondary alcohols.

In place of isopropyl magnesium iodide, there can be employed propyl magnesium iodide, isobutyl magnesium iodide, cyclohexyl magnesium chloride, and other organo-magnesium halides.

The invention will be further described with the aid of the following examples which set forth in detail, but by way of illustration only, several satisfactory modes of carrying out the invention:

Example 1

1 gram of crystallized follicle hormone, of melting point 253°–256° C., is dissolved in absolute ether which has been dried over sodium. The ether solution of the hormone is then poured drop by drop into an ether solution of an excess of methyl magnesium iodide produced in known manner; the reaction mixture is then heated to the boiling point for about one-half hour. After cooling of the solution, it is acidified with hydrochloric acid and after dilution with water is shaken with ether. After drying and evaporation of the ether, the product is obtained in crystalline form.

In place of methyl magnesium iodide, other Grignard reagents may be employed, for example, ethyl magnesium bromide, phenyl magnesium bromide, etc. Organic zinc halides or other organo metallic halides may be employed. The conversion can also be effected directly with organic alkali compounds, or, for example, according to the process of Schorigin with the aid of mercury alkyl compounds.

Example 2

To an ether solution of methyl magnesium iodide, produced with 4.875 grams dry magnesium turnings, 12.5 ccm. methyl iodide, and 160 ccm. of dry ether in the presence of a trace of iodine (which are five times the quantities necessary to produce the 3 mols $CH_3MgI$ theoretically required for the treatment according to the Grignard method of 1 mol of follicle hormone benzoate), there is gradually added with stirring a solution of 5 grams of follicle hormone benzoate of melting point 216°–220° C. in 150 cc. of dry benzene. After the addition of the benzoate solution the reaction liquid is heated at the boiling point for about one and one-half hours and after cooling is decomposed with water and hydrochloric acid (1:5), while being cooled with ice, and is then taken up with ether. The ether solution is successively washed with water, aqueous sodium thiosulfate solution and again with water and then dried and evaporated.

The residue obtained is saponified upon the steam bath by heating for 3 hours with a 5% solution of potassium hydroxide in methyl alcohol. After cooling, the liquid is diluted with water, acidified with dilute HCl (1:5), extracted with ether and the ether solution successively extracted with dilute soda solution (to remove the benzoic acid) and then thoroughly with 5% aqueous potassium hydroxide. After acidification of the potassium hydroxide extracts, the methyldihydro follicle hormone separates out in crystalline form and can be isolated by filtration or by being taken up in ether. The yield is almost quantitative. According to theory, the reaction product represents a non-sharply melting mixture of two isomeric tertiary carbinols and in concentrated sulfuric acid in the light of the analyzing quartz lamp shows a blue-green color and fluorescence. The physiological action of the preparation in the Allen-Doisy test amounts to 3–4 million rat-units per gram in subcutaneous injection in aqueous solution and six fold subdivision.

Example 3

For the production of ethyldihydro follicle hormone, an ethereal solution of ethyl magnesium iodide is prepared from 2.925 grams of dry magnesium turnings, 9.7 ccm. ethyl iodide and 80 ccm. of dry ether, that is, five times the quantities theoretically required for the treatment by the Grignard process of 1 mol of follicle hormone benzoate, in the presence of a trace of iodine. The ethyl magnesium iodide solution is then mixed as in Example 2 with good stirring with a solution of 2 grs. of follicle hormone benzoate of melting point 216°–218° C. in 60 ccm. of dry benzene in the course of one hour. The reaction liquid is then heated at the boiling point for about 1½ hours, is then cooled and decomposed with water and dilute HCl (1:5) with cooling and is then taken up with ether. The further treatment is similar to that described in Example 2.

The ethyldihydro follicle hormone obtained after the saponification forms, like the methyl product (Examples 1 and 2), a non-sharply melting mixture of isomers having a physiological action of more than 2,000,000 rat-units per gram subcutaneous injection in aqueous solution and six-fold subdivision.

Example 4

A solution of methyl magnesium iodide in ether prepared by reacting 0.5 grs. of dry magnesium turnings, 1.28 ccm. of methyl iodide, 20 ccm. of dry ether, and a trace of iodine, is combined in the manner described in Examples 2 and 3 with a solution of 385 mg. of the male germinal gland hormone $C_{19}H_{30}O_2$ in 100 ccm. of dry ether and the reaction liquid then heated at the boiling point for 1½ hours. The quantity of methyl magnesium iodide employed in the reaction corresponds to about eight times the quantity theoretically required. The reaction liquid is cooled and is then decomposed with ice and dilute HCl (1:5) and is then taken up with ether. The ethereal solution is first washed with water, then with aqueous sodium thiosulfate solution and finally again with water, and is then dried and evaporated. The crystallized reaction product, like the tertiary carbinols obtained from the follicle hormones, represents a mixture of two isomers and consequently has no sharp melting point. The physiological action of the preparation in capon comb units amounts to 50 gamma capon units.

Example 5

2 grams of follicle hormone benzoate of melting point 215°–218° C. are dissolved in 100 ccm. of dry benzol and the solution treated in the course of a half hour with an ethereal solution of isopropyl magnesium iodide produced from 1.431 grs. of magnesium turnings, 100 ccm. of dry ether, 10 grs. of isopropyl iodide and a trace of iodine. The reaction liquid is then heated at the boiling point for about 1½ hours, and after cooling is decomposed with water and dilute hydrochloric acid. The reaction product is separated in known manner and forms a reddish viscous resin with a physiological value of 1,000,000 mouse-units per gram, tested in sesame oil solution.

The resin is saponified by heating for three hours on the water bath with a 5% potassium hydroxide solution in methyl alcohol, the resulting liquid after cooling being diluted with water, acidified with hydrochloric acid and extracted with ether. To remove the benzoic acid the ethereal solution is first shaken with soda and is then repeatedly shaken with a 5% aqueous potassium hydroxide solution. Upon acidifying the combined alkali extracts, a light brown crystalline precipitate separates out. The product has proved to be considerably effective physiologically with 12,000,000 mouse-units per gram, subdivided six times and injected in aqueous solution, in the Allen-Doisy test.

By fractionated high vacuum sublimation a while crystalline mass can be separated from the above product whose properties such as a deep blue-green color and fluorescence in concentrated sulfuric acid, and a physiological value of 20-25 million mouse-units per gram, and analytical values agree with those of dihydro-follicle hormone.

The reaction compounds obtained as above described have been found to possess very marked physiological effects. Upon tests with rats the methyl-dihydro follicle hormone of Examples 1 and 2 as stated above was found to have about three to four million rat-units, equivalent to about 25,000,000 to 33,000,000 international units. The ethyl-dihydro follicle hormone of Example 3 was likewise tested on rats and the rat-units was found to lie below 0.5 γ, that is, 1 g. ethyl-dihydro follicle hormone contains more than 2,000,000 rat-units or over 16,000,000 international units per gram. Extensive tests with the reaction product of the male germinal gland hormone and CH₃MgI (Example 4) have shown that the combs of cocks inoculated on the first and second days with 250 γ to 1 mg. of such product increased in area by the third day from about 13.0 to 29.0%, and by the fourth day from about 15.5 to 30.0%.

Where in the claims I refer to organo-metal compounds of the Grignard type, such expression is to be understood as including not only the organic magnesium compounds, but also other organo-metallic compounds capable of converting a keto group into a secondary or tertiary alcohol, such as the organic zinc and mercury compounds referred to hereinbefore.

I claim:

1. The method of producing compounds of improved physiological activity which includes the step of reacting a compound of the group consisting of keto-containing germinal gland hormones and keto-containing reaction products thereof having a cyclopentano phenanthrene structure with an organo-metallic compound of the Grignard type.

2. The method of producing compounds of improved physiological activity which includes the steps of reacting a compound of the group consisting of keto-containing germinal gland hormones and keto-containing reaction products thereof having a cyclopentano phenanthrene structure with an organo-magnesium compound of the Grignard type, and then decomposing the product with water.

3. The method of producing therapeutically valuable alcohols from keto-cyclopentano phenanthrene compounds, which comprises reacting such compounds with a normal alkyl metal halide, and then decomposing the product with water and acid and separating the hydroxylated hormone substance.

4. The method of producing therapeutically valuable secondary alcohols from keto-cyclopentano phenanthrene compounds, which includes the step of reacting such compounds with such organo-metallic compounds of the Grignard type as tend toward the formation of unsaturated hydrocarbons.

5. The method which comprises reacting an organic acid ester of a keto-containing hormone with an isoalkyl metal halide, and then decomposing the resulting product with water and acid and separating the alcohol so obtained.

6. The method which comprises reacting an organic acid ester of a keto-containing hormone with an isoalkyl metal halide, decomposing the resulting product with water and acid, extracting the mixture with a volatile organic solvent for the hormone compound, saponifying the extracted material, then acidifying the same and extracting the mixture with an organic solvent, treating the extract with an inorganic base, and finally acidifying the basic extract and separating the precipitated alcohol.

7. The method of producing compounds of improved physiological activity which includes the steps of reacting a compound of the group consisting of keto-containing germinal gland hormones and keto-containing reaction products thereof having a cyclopentano phenanthrene structure with organo-metallic compounds of the Grignard type, then decomposing the reaction product formed thereby and separating the hydroxylated hormone substance.

8. The method of producing compounds of improved physiological activity which comprises reacting a member of the group consisting of keto-containing-hormones and derivatives of keto-containing hormones with an organo-metallic compound of the Grignard type and then hydrolyzing the product and separating the hydroxylated compound.

9. The method of producing compounds of improved physiological activity which comprises reacting a compound having a cyclopentano phenanthrene structure and containing a CO group with an organo-metallic compound of the Grignard type and then hydrolyzing the product and separating the hydroxylated compound.

10. A saturated 3,17-dialcohol of the C₁₉ series having the cyclopentano phenanthrene structure of the male germinal gland hormone.

11. Substituted follicle hormone compounds having the following structural formula

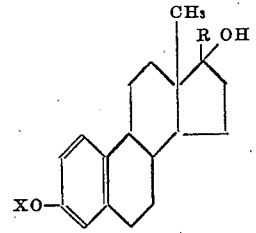

wherein R represents a member of the group consisting of alkyl and aryl groups, and X represents a member of the group consisting of hydrogen, acyl, alkyl and aryl groups, and being physiologically more effective than the follicle hormone.

12. Substituted male sex hormone having the following structural formula

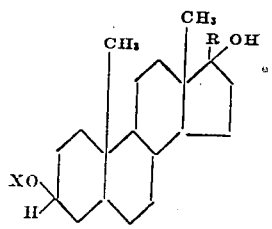

wherein R represents a member of the group consisting of hydrogen, alkyl and aryl groups, and X represents a member of the group consisting of hydrogen, and acyl, alkyl and aryl radicals and being physiologically more effective than the male sex hormone.

13. The method of producing therapeutically valuable alcohols which comprises reacting an unsaturated keto-cyclopentano phenanthrene compound with an organo-metallic compound of the Grignard type, hydrolyzing the resulting reaction product, and separating the hydroxylated compound.

14. A saturated 3,17-dialcohol of the cyclopentano-10,13-dimethyl polyhydro phenanthrene series.

15. A compound as set forth in claim 14, wherein one of the hydroxyl groups is replaced by a group which on hydrolysis is substituted by a hydroxyl group.

16. A saturated tertiary alcohol of the $C_{19}$ series and having the cyclopentano phenanthrene structure, said alcohol having in the 3-position a member of the class consisting of the hydroxyl group and groups which on hydrolysis are replaced by the hydroxyl group.

17. An ether of a dihydro follicle hormone.

18. A member of the group consisting of saturated 3,17-dialcohols of the $C_{19}$ series having the cyclopentano phenanthrene structure and derivatives of said alcohols which are capable of being converted into said alcohols by hydrolysis.

19. 17-ethyl-dihydro follicular hormone.

FRIEDRICH HILDEBRANDT.